(12) United States Patent
Kimoto

(10) Patent No.: US 7,110,450 B1
(45) Date of Patent: Sep. 19, 2006

(54) MOVING PICTURE ENCODING APPARATUS

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/476,241

(22) Filed: Dec. 30, 1999

(30) Foreign Application Priority Data

Jan. 6, 1999 (JP) ................................. 11-001508

(51) Int. Cl.
*H04B 1/66* (2006.01)

(52) U.S. Cl. ............ 375/240; 375/240.24; 375/240.13; 375/240.26; 375/240.02; 382/236; 382/238; 382/239

(58) Field of Classification Search ................ 375/240, 375/240.16, 240.18, 240.03, 240.23, 240.05, 375/240.12, 240.13, 240.24, 240.2, 240.08, 375/240.26, 240.29, 240.02; 382/232, 239, 382/236, 166, 243, 235, 238, 250; 348/409, 348/405, 426, 419, 699
See application file for complete search history.

(56) References Cited

U.S. PATENT DOCUMENTS

| | | | | |
|---|---|---|---|---|
| 4,651,206 A | * | 3/1987 | Ohki ...................... | 375/240.16 |
| 4,739,390 A | * | 4/1988 | Achiha et al. .............. | 348/449 |
| 4,754,492 A | * | 6/1988 | Malvar ....................... | 382/268 |
| 4,984,076 A | * | 1/1991 | Watanabe et al. ......... | 375/240.2 |
| 5,144,428 A | * | 9/1992 | Okuda et al. ............. | 375/240.2 |
| 5,583,573 A | * | 12/1996 | Asamura et al. ........ | 375/240.04 |
| 5,764,296 A | * | 6/1998 | Shin ....................... | 375/240.18 |
| 6,018,366 A | * | 1/2000 | Asai et al. .............. | 375/240.18 |
| 6,044,115 A | * | 3/2000 | Horiike et al. .............. | 375/240 |
| 6,125,144 A | * | 9/2000 | Matsumura et al. ... | 375/240.12 |
| 6,192,148 B1 | * | 2/2001 | Lin ............................ | 382/166 |
| 6,313,863 B1 | * | 11/2001 | Chida ...................... | 348/14.01 |
| 6,463,100 B1 | * | 10/2002 | Cho et al. .............. | 375/240.03 |
| 6,574,277 B1 | * | 6/2003 | Miyamoto ............. | 375/240.13 |

FOREIGN PATENT DOCUMENTS

JP 4-176291 6/1992

OTHER PUBLICATIONS

"Adaptive Intra-Refresh", International Organisation for Standardisation Organisation Internationale de Normalisation, ISO/IEC JTC1/SC29/WG11, Coding of Moving Pictures and Audio, ISO/IEC 14496-2, Committee Draft, Tokyo, Mar. 1998, pp. i-xii and 13-244.

* cited by examiner

*Primary Examiner*—Shawn S. An
(74) *Attorney, Agent, or Firm*—Dickstein Shapiro LLP

(57) ABSTRACT

Deterioration of picture quality is prevented even in a transmission environment in which errors easily occur. A block significance determining section produces block significance for each block as an encoding unit according to predetermined evaluation indices. A map generator generates a refresh map signal representing priority of refresh processing for each block according to the block significance. An adaptive refresh signal generator generates a refresh signal by referring to the refresh priority indicated by the refresh map signal and an allowed block count of blocks for the refresh processing. A moving picture encoding section conducts an intra-frame encoding operation for a block specified by the refresh signal and appropriately selects and executes an intra-frame encoding operation or inter-frame forecast encoding operation for blocks not specified by the refresh signal.

2 Claims, 6 Drawing Sheets

MOVING PICTURE ENCODING APPARATUS

BACKGROUND OF THE INVENTION

The present invention relates to encoding successive input picture signals, and in particular, to a moving picture encoding apparatus for suppressing deterioration of picture quality due to loss of encoded data at occurrence of a transmission error.

DESCRIPTION OF THE PRIOR ART

In the prior art, there has been known a moving picture encoding apparatus described in Appendix H "Adaptive Intra-Refresh" of "Committee Draft 14496-2 (MPEG-4 Visual)" published from ISO/IEC JTC1/SC29/W11 in March 1998. As can be seen from FIG. 1, the encoding apparatus includes a moving picture encoding section 101 which selectively and appropriately conducts intra-frame encoding and inter-frame forecast encoding for each block as a unit of encoding. Section 101 selects a block for which the intra-frame encoding is forcibly conducted. The encoding apparatus further includes, in addition to encoding section 101, a refresh map generating section 102 and a refresh signal generating section 103. Section 102 is connected to section 101. Section 103 is connected to sections 101 and 102.

Moving picture encoding section 101 includes a motion estimating section 104, a frame memory 105, a forecast image generating section 106, a subtractor 107, a mode controller 108, a block selector 109, a two-dimensional (2D) discrete cosine transforming section 110, a quantizing section 111, a variable-length encoding section 112, a de-quantizing section 113, a two-dimensional discrete cosine inverse transforming section 114, and an adder 115.

Motion estimating section 104 detects, on receiving an input image signal 116, a set of motions between frames according to signal 116 and a reference image signal 117 stored in memory 105 to thereby produce motion vectors 118. Motion estimating section 104 calculates for each block in input image signal 116 an error power signal 119 between the block and a block in reference image signal 117, the blocks being at an identical or associated position in the respective signals. Motion estimating section 104 outputs signal 119 to refresh map generating section 102. Section 102 determines a higher priority level of forced refresh for a block of which signal 119 exceeds a threshold value and produces a refresh map signal 120 indicating a forced refresh priority level of the block. Refresh signal generator 103 produces a refresh signal 122 specifying a block for the forced refresh according to refresh map signal 120 and an allowed block count signal 121 indicating the number of blocks for which a forced refresh operation can be conducted in one frame. Generator 103 then sends refresh signal 122 to mode controller 108 controlling an encoding mode of each block. Allowed block count signal 121 is provided as an external signal according to a transmission environment of encoded data. When the number of refresh blocks is increased, although ability to conceal errors is increased, the encoding efficiency is deteriorated. Allowed block count signal 121 is a signal indicating a quantity of signals uniquely determined by a tradeoff between the error concealing ability and the encoding efficiency.

On the other hand, forecast image generator 106 generates a forecast image signal 123 by conducting a motion compensating operation for reference image signal from frame memory 105 using motion vector 118 from motion estimating section 104 to feed signal 123 to subtractor 107. Subtractor 107 subtracts a value of signal 123 from forecast image generator 106 from a value of input image signal 116 to produce an error signal 124 and sends signal 124 to block selector 109. Block selector 109 also receives input image signal 116. Mode controller 108 receives input image signal 116 and refresh signal 122.

When mode controller 108 is receiving refresh signal 122 from generator 103, controller supplies a selection control signal 125 to block selector 109 to select the intra-frame encoding for a block specified by refresh signal 122. Block selector 109 accordingly selects a block (data) of input image signal 116 and supplies the data to 2D discrete cosine transformer 110. When not receiving refresh signal 122 from generator 103, mode controller 108 sends, if error signal 124 has a value equal to or less than a predetermined threshold value, selection control signal 125 to block selector 109 to select an inter-frame forecast encoding. In response thereto, selector 109 selects a block (data) of error signal 124 and feeds the data to cosine transformer 110. When not receiving refresh signal 122 from generator 103, mode controller 108 sends, if error signal 124 has a value more than a predetermined threshold value, selection control signal 125 to block selector 109 to select intra-frame encoding. Selector 109 responsively selects a block (data) of input image signal 116 and feeds the data to cosine transformer 110.

Transformer 110 conducts a two-dimensional discrete cosine transformation for data selected by selector 109 to send a result of the transformation to quantizing section 111. Section 111 quantizes the data and delivers a quantized signal to variable-length encoding section 112. Section 112 accomplishes a variable-length encoding for the data received to resultantly produce output data 126. De-quantizing section 113 receives the data from quantizing section 111 to de-quantize the data and feeds a dequantized result to two-dimensional discrete cosine inverse transformer 114. Section 114 conducts a two-dimensional discrete cosine inverse transformation for the data from de-quantizing section 113 and delivers an inversely transformed result to adder 115. Adder 115 adds a value of data from inverse transformer 114 to a value of forecast image signal 123 from generator 106 to produce reference image signal 127 and stores signal 127 in frame memory 105.

FIG. 2 shows in a schematic diagram a method of concealing errors on a decoding side in the encoding method of the prior art. For a block in which data is lost due to a transmission error, the missing data is compensated for by copying onto the block a block at the same position in a frame preceding the pertinent frame. In the encoding method, even when data losses take place, picture quality can be kept at a desired level by selectively conducting a forced refresh operation for blocks greatly deteriorated in picture quality as a result of the compensating operation. As above, the moving picture encoder of the prior art forcibly refreshes blocks of which deterioration in picture quality exceeds threshold value in the error concealing operation. Namely, the apparatus refreshes these blocks at a period according to an equal probability.

However, in the moving picture encoder of the prior art, a frequency of forced refresh operations to determine efficiency of the error concealment and a threshold value to determine the refresh candidate blocks depend on a transmission environment and distribution of image. This consequently leads to a problem that an area which particularly influences picture quality is not effectively refreshed and even when the error concealment is achieved, an image resultantly obtained has only a low rank according to a subjective evaluation.

In the moving picture encoder of the prior art, only a simple error concealing operation is to be conducted on a decoding side. There consequently arises a problem that even when the decoding side employs a higher-level error concealing operation, the picture quality cannot be improved.

SUMMARY OF THE INVENTION

It is therefore an object of the present invention to provide a moving picture encoding apparatus capable of preventing deterioration of picture quality even in an environment in which transmission errors frequently occur during data transmission.

To achieve the object above in accordance with a first aspect of the present invention, there is provided a moving picture encoding apparatus for encoding successive input image signals. The apparatus includes block significance determining means for determining block significance for each block as an encoding unit of the input image signals according to evaluation indices predetermined; map generating means for generating, according to the block significance, a refresh map signal representing priority of refresh processing for each block; adaptive refresh signal generating means for referring to refresh priority indicated by the refresh map signal and an allowed number of blocks for refresh processing in a frame to be encoded, selecting a block for refresh processing, and generating a refresh signal specifying the block for refresh processing; and moving picture encoding means for conducting an intra-frame encoding operation for a block specified by the refresh signal and for appropriately selecting and executing an intra-frame encoding operation or an inter-frame forecast encoding operation for a block not specified by the refresh signal.

In accordance with a second aspect of the present invention, the block significance determining means includes block feature calculating means for calculating for each block a block feature which is a quantity representing a feature of signal distribution of the block and a visual characteristic of the block and significance generating means for comparing the block feature with one or more threshold values and thereby generating block significance for each block.

In accordance with a third aspect of the present invention, the block significance determining means includes block feature calculating means for calculating a block feature which is a quantity indicating a variance of intra-block signals and significance generating means for comparing the block feature with one or more threshold values and thereby generating block significance for each block.

In accordance with a fourth aspect of the present invention, the block significance determining means includes block feature calculating means for calculating for each block a block feature which is a quantity indicating power of a signal obtained by passing intra-block signals through a band-pass filter and significance generating means for comparing the block feature with one or more threshold values and thereby generating block significance for each block.

In accordance with a fifth aspect of the present invention, there is provided a moving picture encoding apparatus for encoding successive input image signals. The apparatus includes block significance determining means for determining block significance for each block as an encoding unit of the input image signals according to block information and evaluation indices predetermined; map generating means for generating, according to the block significance, a refresh map signal representing priority of refresh processing for each block; adaptive refresh signal generating means for referring to refresh priority indicated by the refresh map signal and an allowed number of blocks for refresh processing in a frame to be encoded, selecting a block for refresh processing, and generating a refresh signal specifying the block for refresh processing; and moving picture encoding means for generating the block information indicating power of an error between frames and a quantity of motion generated during a block encoding operation and sending the block information to the block significance determining means, for conducting an intra-frame encoding operation for a block specified by the refresh signal and for appropriately selecting, and for executing an intra-frame encoding operation or an inter-frame forecast encoding operation for a block not specified by the refresh signal.

In accordance with a sixth aspect of the present invention, the block significance determining means includes block feature calculating means for calculating for each block a block feature which is a quantity representing a feature of signal distribution of the block and a visual characteristic of the block, first significance generating means for comparing the block feature with one or more threshold values and thereby generating first block significance for each block; visual deterioration calculating means for calculating for each block, according to the block information, a quantity of visual deterioration representing a degree of visual picture deterioration when a forecast error signal is lost; second significance generating means for comparing the quantity of visual deterioration with one or more threshold values and thereby generating second block significance for each block; and block significance totaling means for combining the first block significance with the second block significance and supplying resultant block significance to the map generating means.

In accordance with a seventh aspect of the present invention, the block significance determining means includes block feature calculating means for calculating for each block a block feature which is a quantity representing a feature of signal distribution of the block and a visual characteristic of the block, first significance generating means for comparing the block feature with one or more threshold values and thereby generating first block significance for each block, visual deterioration calculating means for calculating for each block a quantity of visual deterioration representing a quantity of power of an error between a block in the input image signal and a block in a reference frame, the blocks being respectively at the same position; second significance generating means for comparing the quantity of visual deterioration with one or more threshold values and thereby generating second block significance for each block; and block significance totaling means for combining the first block significance with the second block significance and supplying resultant block significance to the map generating means.

In accordance with an eighth aspect of the present invention, the block significance determining means includes block feature calculating means for calculating for each block a block feature which is a quantity representing a feature of signal distribution of the block and a visual characteristic of the block, first significance generating means for comparing the block feature with one or more threshold values and thereby generating first block significance for each block, visual deterioration calculating means for calculating for each block a quantity of visual deterioration representing a quantity of power of an error between a block in the input image signal and a block in a reference frame obtained by inter-frame forecast processing, the blocks being respectively at the same position; second significance generating means for comparing the quantity of visual deterioration with one or more threshold values and thereby generating second block significance for each block; and block significance totaling means for combining the first block significance with the second block significance and supplying resultant block significance to the map generating means.

In accordance with a ninth aspect of the present invention, the block significance determining means includes block feature calculating means for calculating for each block a block feature which is a quantity representing a feature of signal distribution of the block and a visual characteristic of the block, first significance generating means for comparing the block feature with one or more threshold values and thereby generating first block significance for each block, visual deterioration calculating means for calculating for each lock a quantity of visual deterioration representing a quantity obtained by weighting, according to a quantity of motion of a block, power of an error between a block in the input image signal and a block in a reference frame, the blocks being respectively at the same position, second significance generating means for comparing the quantity of visual deterioration with one or more threshold values and thereby generating second block significance for each block, and block significance totaling means for combining the first block significance with the second block significance and supplying resultant block significance to the map generating means.

In accordance with a tenth aspect of the present invention, the block significance determining means includes block feature calculating means for calculating for each block a block feature which is a quantity representing a feature of signal distribution of the block and a visual characteristic of the block, first significance generating means for comparing the block feature with one or more threshold values and thereby generating first block significance for each block, visual deterioration calculating means for calculating for each block a quantity of visual deterioration representing a quantity obtained by weighting, according to a quantity of motion of a block, power of an error between a block in the input image signal and a block in a reference frame obtained by inter-frame forecast processing, the blocks being respectively at the same position; second significance generating means for comparing the quantity of visual deterioration with one or more threshold values and thereby generating second block significance for each block; and block significance totaling means for combining the first block significance with the second block significance and supplying resultant block significance to the map generating means.

In accordance with an 11th aspect of the present invention, the block significance determining means includes block feature calculating means for referring to information of a change in luminance of intra-block signals and a luminance level, thereby generating sensitivity information for the information according visual characteristics of a human, and calculating the sensitivity information as a quantity of a block feature; first significance generating means for comparing the block feature with one or more threshold values and thereby generating first block significance for each block, visual deterioration calculating means for calculating for each block, according to the block information, a quantity of visual deterioration representing a degree of visual picture deterioration when a forecast error signal is lost; second significance generating means for comparing the quantity of visual deterioration with one or more threshold values and thereby generating second block significance for each block; and block significance totaling means for combining the first block significance with the second block significance and supplying resultant block significance to the map generating means.

In accordance with a 12th aspect of the present invention, there is provided a moving picture encoding apparatus for encoding successive input image signals. The apparatus includes block significance determining means for determining block significance for each block as an encoding unit of the input image signals according to evaluation indices predetermined, map generating means for generating, according to the block significance, a refresh map signal representing priority of refresh processing for each block; refresh history determining means for temporarily keeping therein the refresh map signal from the map generating means, referring to history of the refresh map signal and a refresh signal, modifying a value of forced refresh priority indicated by the refresh map signal, and thereby generating a modified refresh map signal; adaptive refresh signal generating means for referring to refresh priority indicated by the refresh map signal and an allowed number of blocks for refresh processing in a frame to be encoded, selecting a block for refresh processing, and generating the refresh signal specifying the block for refresh processing; and moving picture encoding means for conducting an intra-frame encoding operation for a block specified by the refresh signal and for appropriately selecting and executing an intra-frame encoding operation or an inter-frame forecast encoding operation for a block not specified by the refresh signal.

In accordance with a 13th aspect of the present invention, the refresh history determining means includes a map history memory for referring to the refresh map signal from the map generating means and the refresh signal from the adaptive refresh signal generating means, thereby updating history, beginning at a start of encoding processing, of a refresh map, and storing therein the refresh map; a refresh signal history memory for storing therein history of the refresh signal, and a map modifying section for referring to the map history stored in the map history memory and the refresh history stored in the refresh signal history memory and thereby modifying forced refresh priority indicated by the refresh map signal from the map generating means.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
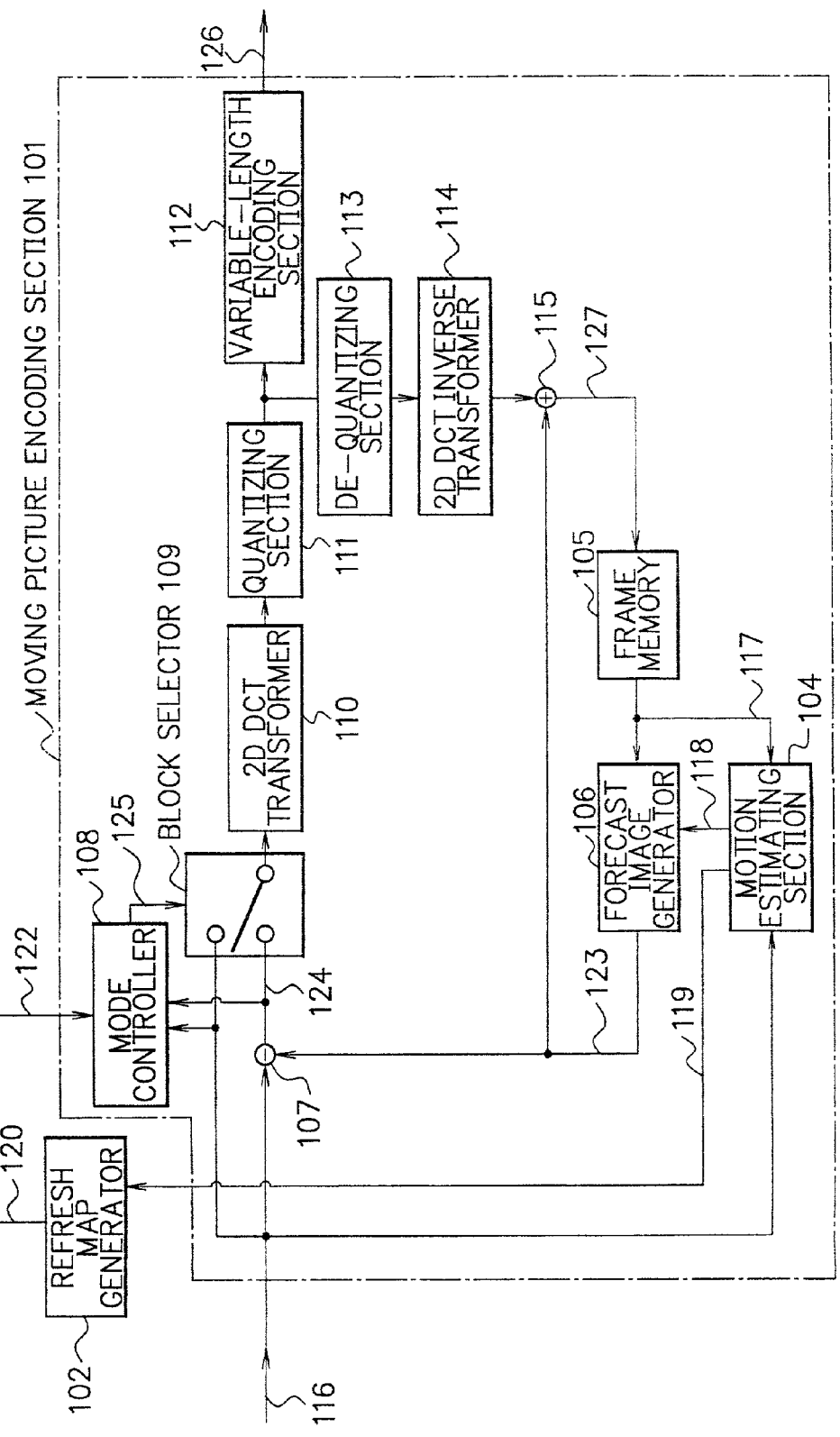
FIG. 1 is a block diagram showing a moving picture encoding apparatus of the prior art.
Figure 2:
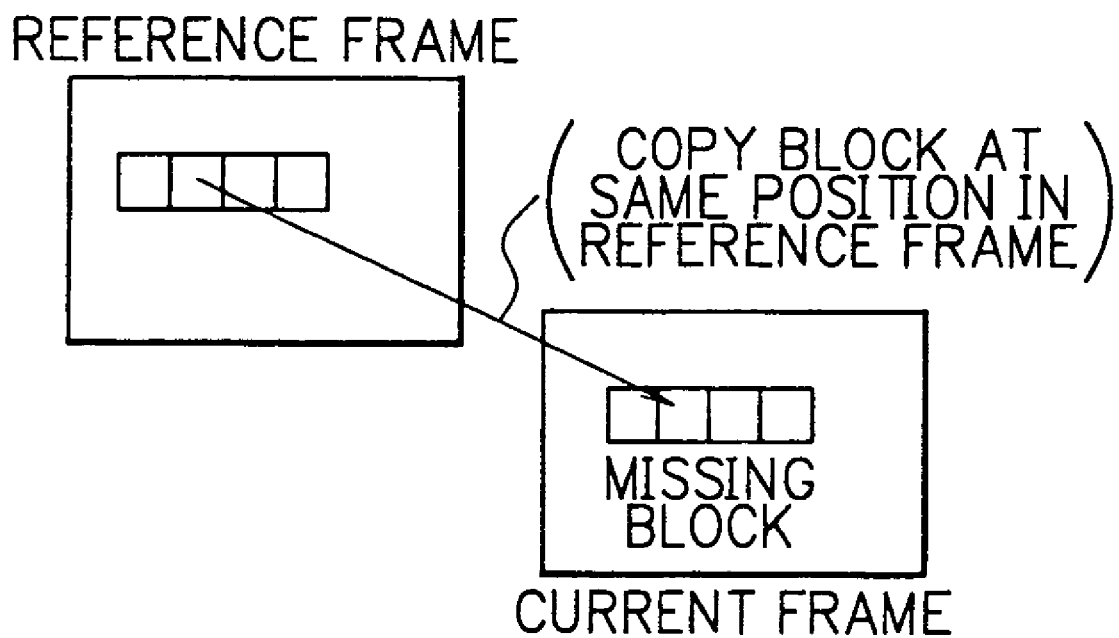
FIG. 2 is a diagram for explaining an error concealing operation in the moving picture encoding apparatus of the prior art.

Referring now to the drawings, description will be given of an embodiment of the present invention.

Figure 3:
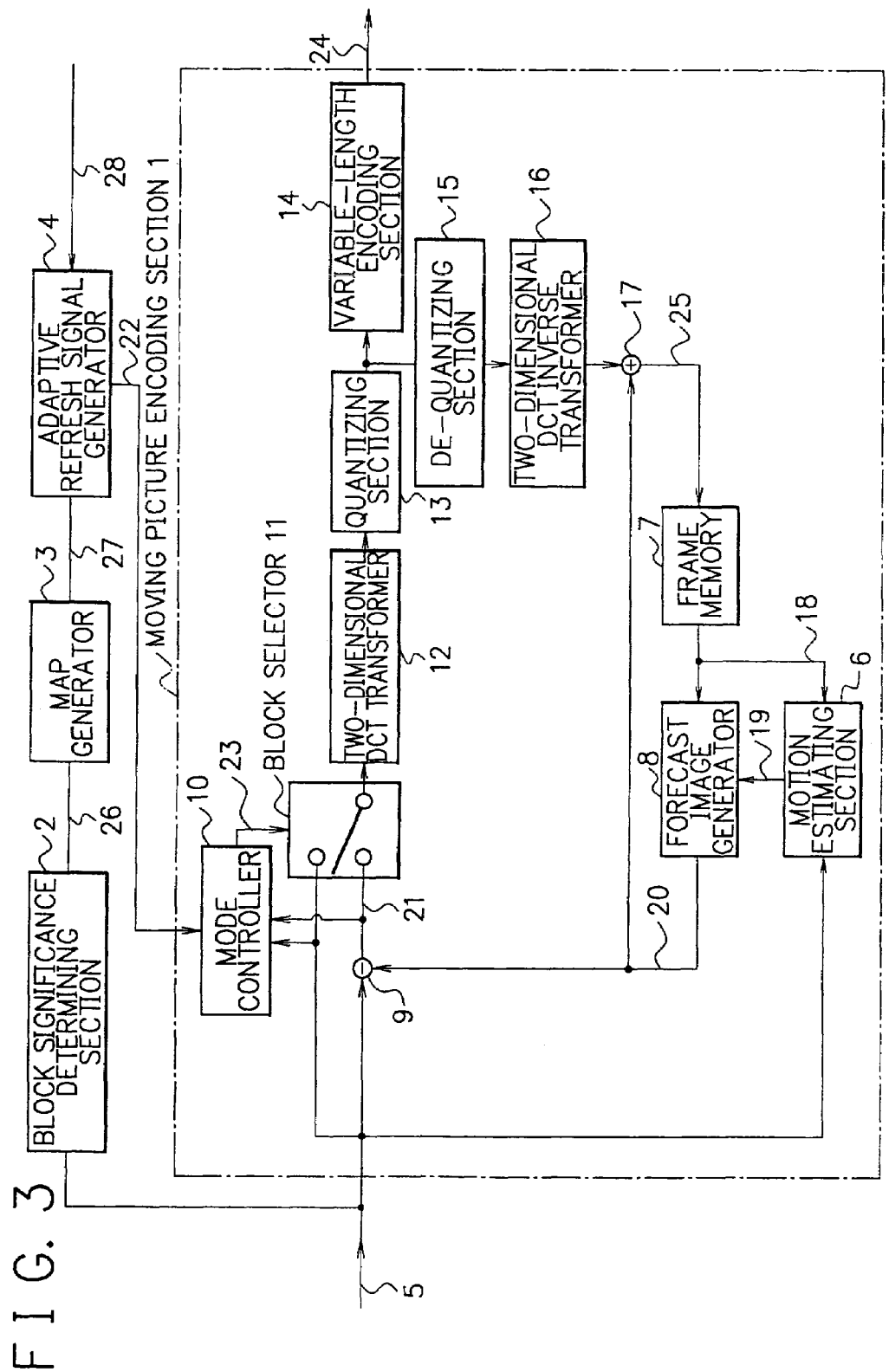
FIG. 3 is a block diagram showing a first embodiment of a moving picture encoding apparatus in accordance with the present invention.

As shown in FIG. 3, the first embodiment of the moving picture encoding apparatus in accordance with the present invention includes a moving picture encoding section 1, a block significance determining section, a map generator 3, and an adaptive refresh signal generator 4. Section 2 receives an input image signal 5. Map generator 3 is connected to section 2. Adaptive refresh signal generator 4 is connected to encoding section 1 and map generator 3.

Encoding section 1 includes a motion estimating section 6, a frame memory 7, a forecast image generator 8, a subtractor 9, a mode controller 10, a block selector 11, a two-dimensional discrete cosine transformer 12, a quantizing section 13, a variable-length encoding section 14, a de-quantizing section 15, a two-dimensional discrete cosine inverse transformer 16, and an adder 17. Motion estimating section 6 receives input image signal 5. Frame memory 7 is connected to section 6. Forecast image generator 8 is connected to section 6 and memory 7. Subtractor 9 receives input image signal 5 and is connected to forecast image generator 8. Mode controller 10 receives input image signal 5 and is connected to signal generator 4 and subtractor 9. Block selector 11 receives input image signal 5 and is connected to subtractor 9 and mode controller 10. Discrete cosine transformer 12 is connected to block selector 11. Quantizing section 13 is linked with transformer 12. Variable-length encoding section 14 is connected to section 13. De-quantizing section 15 is coupled with quantizing section 13. discrete cosine inverse transformer 16 is connected to de-quantizing section 15. Adder 17 is connected to forecast image generator 8 and inverse transformer 16.

Motion estimating section 6 detects, on receiving image signal 5, a set of motions between frames according to signal 5 and a reference image signal 18 stored in memory 7 to produce a motion vectors 19. Forecast image generator 8 conducts motion compensating operation for signal 18 from memory 7 according to motion vector 19 from motion estimating section 6 to produce a forecast image signal 20 and sends signal 20 to subtractor 9. Subtractor 9 subtracts a value of signal 20 from generator 8 from a value of image signal 5 to create an error signal 21 and sends signal 21 to block selector 11. Block selector 11 also receives image signal 5. Mode controller 10 receives signal 5 and error signal 21, and a refresh signal from adaptive refresh signal generator 4.

When controller 10 is receiving refresh signal 22 from generator 4, mode controller 10 sends a selection control signal 23 to block selector 11 to select an intra-frame encoding operation for a block specified by refresh signal 22. Block selector 11 therefore selects a block (data) of input image signal 5 and supplies the block to cosine transformer 12. When controller 10 is not receiving refresh signal 22 from generator 4, mode controller 10 sends a selection control signal 23 to block selector 11 to select an inter-frame encoding operation if error signal 21 takes a value equal to or less than a predetermined threshold value. In response thereto, selector 11 selects a block (data) of error "signal 21 to send the data to cosine transformer 12. If error signal 21 takes a value equal to or more than a predetermined threshold value when controller 10 is not receiving refresh signal 22 from generator 4, mode controller 10 sends a selection control signal 23 to block selector 11 to select an intra-frame encoding operation. In response thereto, selector 11 selects a block (data) of image signal 5 to send the data to cosine transformer 12.

Transformer 12 conducts a two-dimensional discrete cosine transformation for the data selected by selector 10 and delivers a result of the transformation to quantizing section 13. Section 13 quantizes the data to feed resultant data to variable-length encoding section 14. Section 14 achieves a variable-length encoding operation for the data to generate output data 24. De-quantizing section 15 receiving data from quantizing section 13 to de-quantize the data and sends resultant data to cosine inverse transformer 16. Inverse transformer 16 conducts a two-dimensional discrete cosine inverse transformation for the data to deliver a result of the inverse transformation to adder 17. Adder 17 adds a value of data from inverse transformer 16 to a value of forecast image signal 20 from forecast image generator 8 to store resultant data in frame memory 7.

Block significance determining section 2 refers to input image signal 5 to produce block significance 26 indicating significance for each block of signal 5. Map generator 3 interprets block significance 26 from section 2 as priority to execute a forced refresh operation and therefore generates a refresh map signal 27 representing refresh priority for each block of signal 5 and sends signal 27 to adaptive refresh signal generator 4. Generator 4 generates refresh signal 22 specifying a block to be forcibly refreshed according to refresh map signal 27 and an allowable block count signal 28 indicating an allowable number of blocks for which the forced refresh operation can be conducted in one frame and transmits signal 22 to mode controller 10. Signal 28 is provided as an external signal according to a data transmission environment. When the number of refresh blocks is increased, the encoding efficiency is lowered although ability to conceal errors is improved. Signal 28 indicates a quantity uniquely determined by a tradeoff between the error concealing capability and the encoding efficiency for a predetermined transmission rate.

Figure 4:
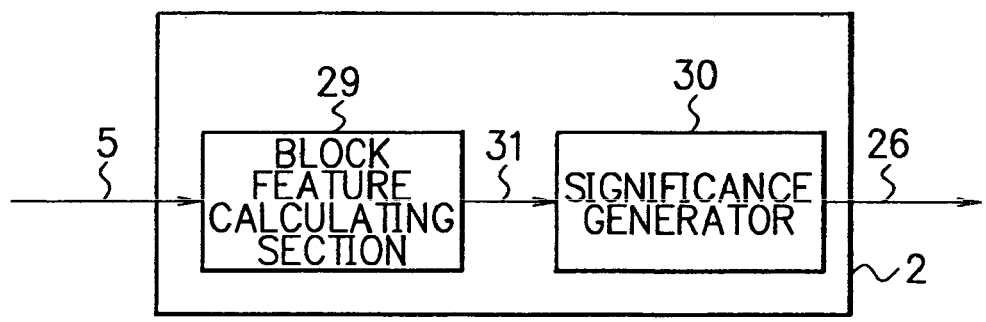
FIG. 4 is a block diagram showing a block significance determining section of the first embodiment.
Figure 5:
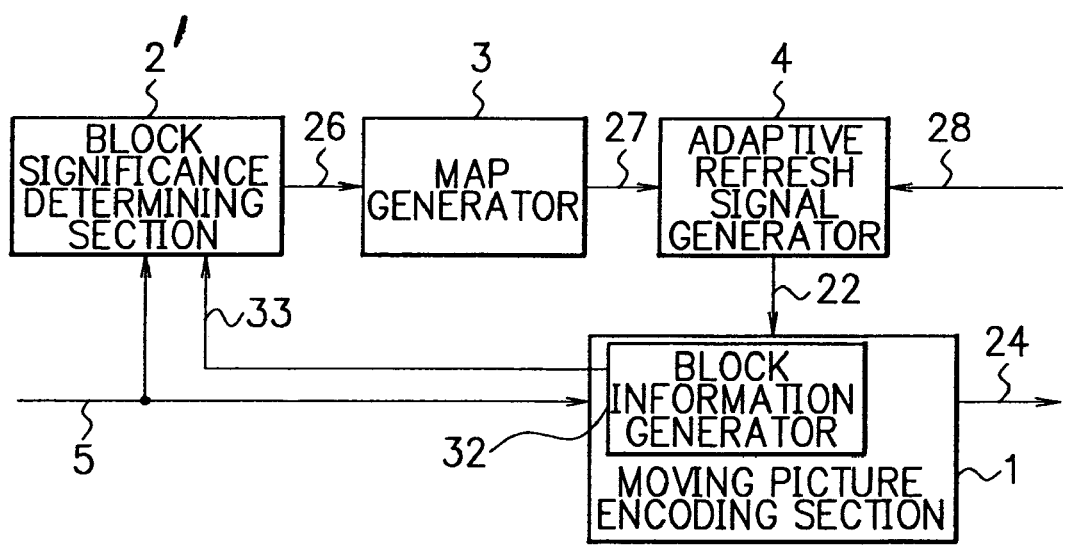
FIG. 5 is a block diagram showing a second embodiment of a moving picture encoding apparatus in accordance with the present invention.

FIG. 4 shows block significance determining section 2. Section 2 includes a block feature calculating section 29 and a significance generator 30. Section 29 receives input image signal 5. Generator 30 is connected to calculating section 29 and map generator 3. For each block of image signal 5, calculating section calculates a block feature 31 representing importance regarding improvement of picture quality. The importance represents a degree of a ratio of visually important information such as a contour or easiness of subjective perception of deterioration in picture quality. The first embodiment employs, for the block feature, a variance of component of luminance or color difference representing variation of intra-block signals, weighted sum thereof, and a quantity representing power of an edge component obtained by a high-pass filter or another edge extracting filer. An area having a large value of variance in a block and an area of a contour provide visually important information and strongly influence the subjective picture quality. Other block features may be distance between a maximum value and a minimum value of intra-block signals, a difference between power of a luminance signal of a pertinent block and power of a luminance signal of a block adjacent thereto, a difference between power of a color difference signal of a pertinent block and power of a color difference signal of a block adjacent thereto, and a weighted sum of coefficient signals, after a frequency conversion, according to a visual model and saturation (absolute value of a color difference signal).

Significance generator 30 compares block feature with a predetermined threshold value to generate block significance 26. Generator 30 has one or a plurality of threshold values and compares feature 31 with the values to obtain block significance 26. Adaptive refresh signal generator 4 adaptively achieves a refresh operation according to refresh priority indicated by refresh map signal 27, for example, uses a short refresh period for a block with high priority and a long refresh period for a block with low priority.

Description will now be given of a second embodiment of the present invention by referring to the drawings. In the second embodiment, the same constituent components of those of the first embodiment are assigned with the same reference numerals. In the second embodiment, block significance determining section 2' generates block significance 26 by referring to, in addition to input image signal 5, block information 33 generated during a block encoding operation by a block information generator 32 of moving picture encoding section 1.

Figure 6:
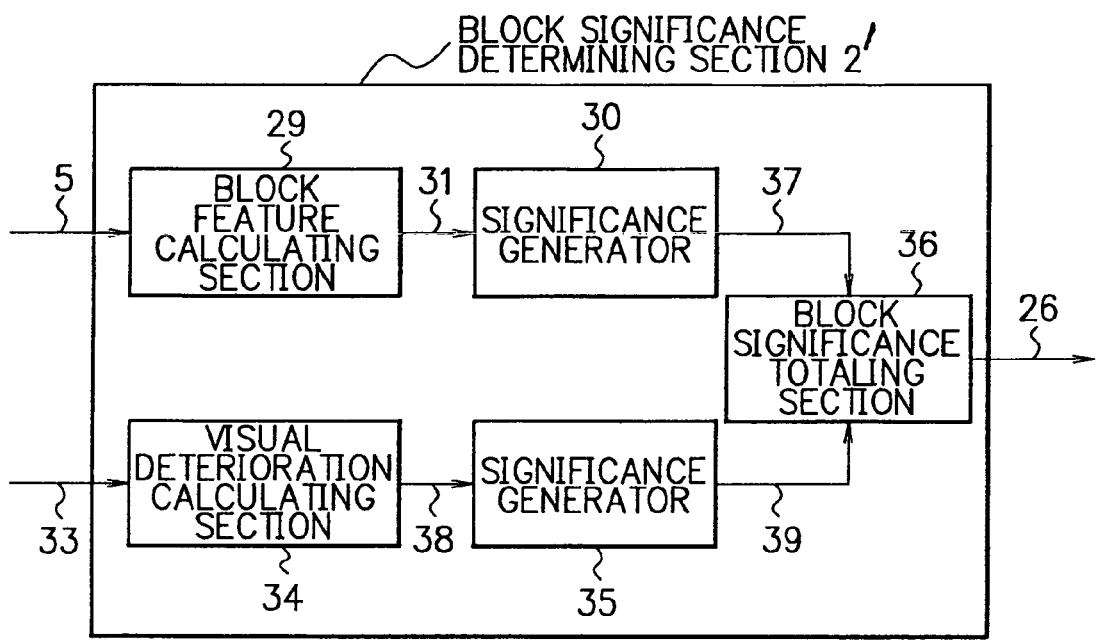
FIG. 6 is a block diagram showing a block significance determining section of the second embodiment.

FIG. 6 shows block significance determining section 2' in the second embodiment. Section 2' includes a block feature calculating section, a significance generator 30, a visual deterioration calculating section 34, a significance generator 35, and a block significance totaling section 36. Visual deterioration calculating section 34 is connected to block information generator 32 of encoding section 1. Section 34 receives block information 33 from generator 32. Significance generator 35 is connected to section 34. Totaling section 36 is linked with significance generators 30 and 35 and map generator 3. Generator 30 compares block feature 31 with one or more predetermined threshold values predetermined to generate block significance 37. Calculating section 34 refers to block information 33 to calculate visual deterioration 38 representing a degree of visual deterioration of a picture for each block when forecast error signals are lost. Significance generator 35 compares visual deterioration 38 with a predetermined threshold value to create block significance 39. Generator 35 has one or more values to compare visual deterioration with the threshold values to set block significance 26 as a result.

Block information 33 includes, in addition to first error power with respect to a block at the same position of the reference frame used in the apparatus of the prior art, second error power with respect to a block at the same position in a forecast image for which a motion compensation has been conducted and a quantity of motion of a block. Visual deterioration 38 includes, in addition to the first and second error power and the quantity of block motion, a product between a quantity of motion and error power. The error power indicates energy of a signal lost at occurrence of an error. Moreover, in blocks having the same error power, a block with a larger quantity in motion between frames possibly propagates picture quality deterioration in a broader area. Consequently, the error power may be weighted by the quantity of motion.

Block significance totaling section 36 totals block significance 37 from significance generator 30 and block significance 39 from significance generator 35 to produce block significance 26 and sends block significance 26 to map generator 3. If significance is represented in binary notation in section 36, a logical sum or product is produced as the total value. If significance is represented in multi-value notation, a total of an addition or a result of a multiplication is generated as the total value.

In the apparatus of the prior art, the evaluation value of picture quality deterioration in the error concealing operation is error power with respect to a block at the same position in a reference frame, and the forced refresh priority is set with an equal probability for the blocks for which the error power is equal to or more than a predetermined threshold value. On the other hand, in the second embodiment of the present invention, among the blocks as candidates for refresh processing, those particularly influence the improvement of picture quality in the error concealing operation can take precedence in the refresh operation. Such blocks influencing the improvement of picture quality contain visually important information such as the contour information described above.

As a characteristic of sense of sight of a human, for blocks having almost equal error power, sensitivity to deterioration in picture quality increases for those having average luminance at about an intermediate level. It has been known that sensitivity is further increased for the block having a great change in luminance. Block feature calculating section 29 of FIG. 6 calculates, according to an average and a variance of intra-block signals, information of sensitivity to picture quality deterioration in consideration of characteristics of sense of sight of a human. Block significance 37 produced by significance generator 30 using the information of sensitivity as block feature 31 is combined with block significance 39 generated by significance generator 35 using visual deterioration 38. This makes it possible to preferentially refresh; among the blocks having considerable deterioration in picture quality, the blocks particularly conspicuous for the sense of sight. The second embodiment therefore can improve the picture quality in the error concealing operation when compared with the apparatus of the prior art.

Figure 7:
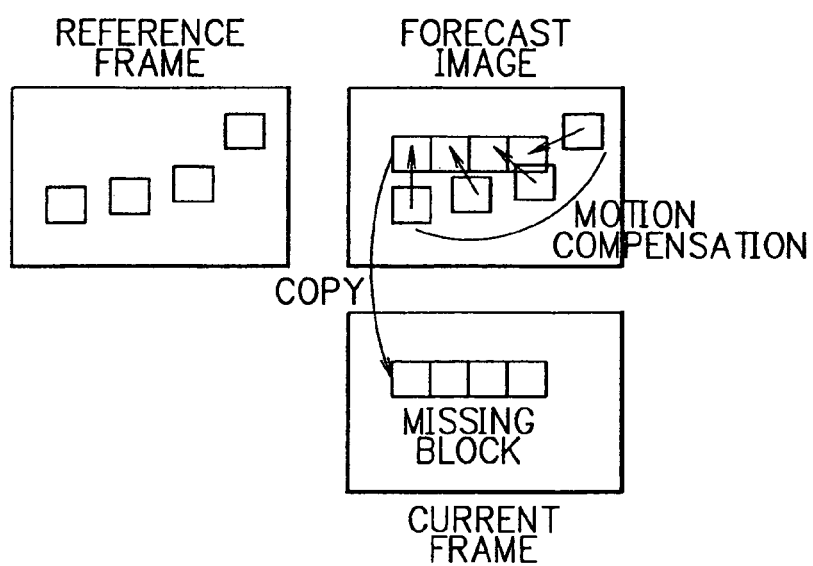
FIG. 7 is a schematic diagram for explaining a high-level error concealing operation using a quantity of motion in the second embodiment.

Committee Draft 14496-2 (MPEG-4 Visual)" published from ISO/IEC JTC1/SC29/WG11 describes, as a data transmission method in a transmission environment in which tolerance is required for the method, a method in which a quantity of motion and information of conversion coefficients used in inter-frame forecast encoding are transmitted independently of each other. In the transmission method, when a data loss occurs in the information of conversion coefficients due to an error, a highly efficient operation to conceal the error can be achieved. Namely, a forecast image can be generated through a motion compensating operation using a reference frame and a quantity of motion, and the forecast image is copied onto a pertinent block as shown in FIG. 7. However, in the forced refresh operation used by the apparatus of the prior art, error power with respect to a block at the same position on a reference frame is employed as an evaluation value for the forced refresh operation. In consequence, it is impossible to effectively select blocks having considerable deterioration in picture quality. In this situation, a forced refresh operation using the second error power, i.e., power of the forecast error signal is effectively applicable. For this purpose, the second embodiment can efficiently control the encoding operation.

Figure 8:
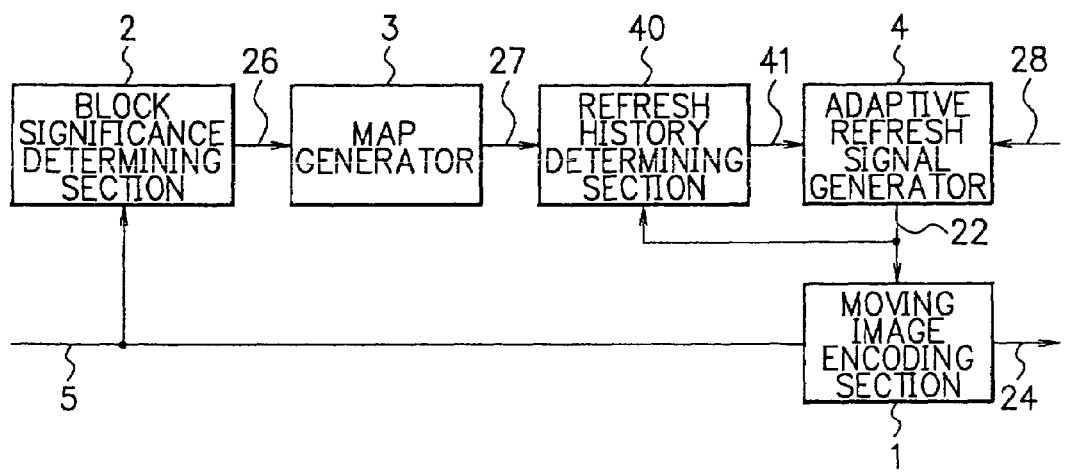
FIG. 8 is a block diagram schematically showing a third embodiment of a moving picture encoding apparatus in accordance with the present invention.

Next, description will be given in detail of a third embodiment in accordance with the present invention. In the third embodiment, the same constituent elements as those of the first embodiment are assigned with the same reference numerals. The third embodiment of a moving picture encoding apparatus is implemented by adding a refresh history determining section 40 to the moving picture encoding apparatus of FIG. 3 as shown in FIG. 8. That is, the moving picture encoding apparatus includes moving picture encoding section 1, block significance determining section 2, map generator 3, refresh history determining section 40, and adaptive refresh signal generator 4. Section 2 receives input image signal 5. Map generator 3 is connected to section 2. Section 40 is coupled with generator 3. Signal generator 4 is connected to encoding section 1 and determining section 40. Section 40 refers to refresh signal from generator 4 and refresh map signal 27 from map generator 3 to update information regarding history of refresh operation. Section 40 modifies refresh map signal 27 using the history information to generate a modified refresh map signal 41 and sends signal 41 to adaptive refresh signal generator 4.

Figure 9:
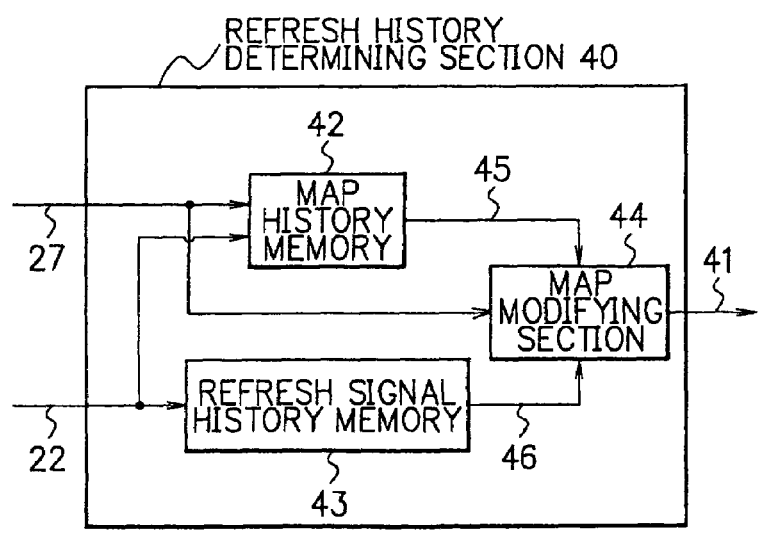
FIG. 9 is a block diagram showing a refresh history determining section in the third embodiment.

FIG. 9 shows refresh history determining section 40. Section 40 includes a map history memory 42, a refresh signal history memory 43, and a map modifying section 44. Map memory 42 is connected to map generator 3. Map history memory 42 receives refresh map signal 27 from map generator 3. Memory 43 is linked with adaptive refresh signal generator 4 and receives refresh signal from adaptive refresh signal generator 4. Map modifying section 44 is connected to map history memory 42, refresh signal history memory 43, and adaptive refresh signal generator 4.

Stored in map history memory 42 is map history 45 indicating information regarding accumulation, beginning at the start point of encoding, of forced refresh priority indicated by refresh map signal 27 and information regarding a lapse time for a block from when the block had high refresh priority to the current point of time. In the moving picture encoding apparatus of the prior art or the present invention, an allowed block count signal is used to indicate the number of allowed blocks for refreshment in one frame according to the data transmission environment. The count signal determines a block to be refreshed. In consequence, there exists a block which is not actually refreshed even if the block has high priority for the forced refresh operation. At occurrence of a block which has high refresh priority at a time and low refresh priority thereafter, namely, at appearance of a missing data in an area in which data little moves between frames after a point of time, if a refresh operation is not executed at a point of a motion, a block having considerable deterioration in picture quality is continuously used as a forecast image. Each time refresh map signal 27 is inputted to map history memory 42, the refresh priority is accumulated to update map history 45. At the same time, when a value of map history 45 is equal to or more than a threshold value and the refresh priority indicated by refresh map signal 27 is zero, a predetermined value is added to the accumulated refresh priority in map history 45. At occurrence of refresh signal 22, map history memory 42 refers to signal 22 to reset, for the pertinent block refreshed, the accumulated refresh priority in map history 45 to zero. Map modifying section 44 refers to map history 45 to detect a block of which the accumulated refresh priority exceeds a threshold value and increases refresh priority thereof in refresh map signal 27.

Refresh signal history memory 43 contains refresh signal history 46 which is information indicating a position of a block actually refreshed in several preceding frames. Memory 43 updates refresh signal history 46 when refresh signal 22 is received and outputs refresh signal history 46 in an encoding stage of a subsequent frame. Map modifying section 44 refers to history 46 to lower, for each block refreshed in several preceding frames, the refresh priority associated therewith in refresh map signal 27.

For example, the picture encoding method of the prior art described in JP-A-4-176291 employs an encoding control method in which whether or not an intra-frame encoding or inter-frame encoding operation is selected in an encoding operation of a block of an input image is monitored. When an inter-frame forecast signal is consecutively selected at least for a predetermined period of time, a forced refresh operation is conducted in a subsequent frame. In contrast therewith, the third embodiment of the present invention refers to the history of the refresh map to detect, among blocks for which the inter-frame forecast signal is successively selected, a block influencing deterioration of picture quality and to thereby preferentially refreshes the block. Consequently, the picture encoding operation can be more efficiently achieved as compared with the prior art. It may also be possible to combine the second embodiment with the third embodiment in accordance with the present invention.

In the embodiments of the present invention, the forced refresh priority is increased for a significant block selected by block significance determining section 2 to preferentially refresh an area influencing subjective picture quality. This advantageously suppresses deterioration in picture quality when a data loss occurs during data transmission. In the embodiments, by using the method of prior art utilizing information obtained when block significance determining section 2 detects a motion, it is possible to implement an adaptive error concealing operation. In the third embodiment of the present invention, refresh history determining section 40 refers to the history of the refresh map to prevent an event in which an area with considerable deterioration of picture quality is not refreshed and is consecutively displayed.

In accordance with the present invention, while the number of blocks to be forcibly refreshed is limited, forced refresh priority can be assigned to blocks in consideration of blocks influencing deterioration of picture quality such as blocks in which important information of an image such as contour information or an area visually conspicuous in an image is not refreshed and is remaining or blocks which are not refreshed and which are disadvantageously remaining in a frame. Therefore, the error concealing operation can be appropriately conducted. Consequently, the data lost at occurrence of an error can be appropriately restored to thereby improve picture quality.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A moving picture encoding apparatus for encoding successive input image signals, comprising:

block significance determining means for determining block significance for each block as an encoding unit of the input image signals according to predetermined evaluation indices;

map generating means for generating, according to the block significance, a refresh map signal representing priority of refresh processing for each block;

refresh history determining means for temporarily keeping therein the refresh map signal from the map generating means, referring to history of the refresh map signal and a refresh signal, modifying a value of forced refresh priority indicated by the refresh map signal, and thereby generating a modified refresh map signal;

adaptive refresh signal generating means for referring to refresh priority indicated by the refresh map signal and an allowed number of blocks for refresh processing in a frame to be encoded, selecting a block for refresh processing, and generating the refresh signal specifying the block for refresh processing; and moving picture encoding means for conducting an intra-frame encoding operation for a block specified by the refresh signal and for appropriately selecting and executing an intra-frame encoding operation or an inter-frame forecast encoding operation for a block not specified by the refresh signal, wherein the refresh history determining means includes a map history memory that refers to the refresh map signal from the map generating means and the refresh signal from the adaptive refresh signal generating means, thereby updating history, beginning at a start of encoding processing, of a refresh map, and storing therein the refresh map.

2. A moving picture encoding apparatus for encoding successive input image signals, comprising:

block significance determining means for determining block significance for each block as an encoding unit of the input image signals according to predetermined evaluation indices;

map generating means for generating, according to the block significance, a refresh map signal representing priority of refresh processing for each block;

refresh history determining means for temporarily keeping therein the refresh map signal from the map generating means, referring to history of the refresh map signal and a refresh signal, modifying a value of forced refresh priority indicated by the refresh map signal, and thereby generating a modified refresh map signal;

adaptive refresh signal generating means for referring to refresh priority indicated by the refresh map signal and an allowed number of blocks for refresh processing in a frame to be encoded, selecting a block for refresh processing, and generating the refresh signal specifying the block for refresh processing; and moving picture encoding means for conducting an intra-frame encoding operation for a block specified by the refresh signal and for appropriately selecting and executing an intra-frame encoding operation or an inter-frame forecast encoding operation for a block not specified by the refresh signal, wherein the refresh history determining means includes a map history memory that refers to the refresh map signal from the map generating means and the refresh signal from the adaptive refresh signal generating means, thereby updating history, beginning at a start of encoding processing, of a refresh map, and storing therein the refresh map, wherein the refresh history determining means includes:

a refresh signal history memory for storing therein history of the refresh signal; and a map modifying section for referring to the map history stored in the map history memory and the refresh history stored in the refresh signal history memory and thereby modifying forced refresh priority indicated by the refresh map signal from the map generating means.

\* \* \* \* \*